(12) United States Patent
Kim et al.

(10) Patent No.: US 10,351,125 B2
(45) Date of Patent: Jul. 16, 2019

(54) METHOD AND ENGINE CLUTCH SYSTEM FOR STABILIZING ENGINE CLUTCH CONTROL, AND VEHICLE EMPLOYING THE METHOD AND ENGINE CLUTCH SYSTEM FOR STABILIZING ENGINE CLUTCH CONTROL

(71) Applicants: HYUNDAI MOTOR COMPANY, Seoul (KR); KIA MOTORS CORPORATION, Seoul (KR)

(72) Inventors: Jong-Hyun Kim, Yongin-si (KR); Seung-Ki Kong, Hwaseong-si (KR); Jae-Shin Yi, Suwon-si (KR); Hak-Sung Lee, Gunpo-si (KR); Tae-Ho Kim, Seoul (KR); Yeon-Ho Kim, Suwon-si (KR)

(73) Assignees: HYUNDIA MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 254 days.

(21) Appl. No.: 15/284,972

(22) Filed: Oct. 4, 2016

(65) Prior Publication Data
US 2017/0166199 A1      Jun. 15, 2017

(30) Foreign Application Priority Data

Dec. 10, 2015   (KR) .......................... 10-2015-0175688

(51) Int. Cl.
*B60W 20/40*          (2016.01)
*B60K 6/387*          (2007.10)
(Continued)

(52) U.S. Cl.
CPC ............. *B60W 20/40* (2013.01); *B60K 6/387* (2013.01); *B60K 6/442* (2013.01); *B60K 6/48* (2013.01);
(Continued)

(58) Field of Classification Search
CPC .... B60W 20/40; B60W 10/02; B60W 10/023; B60W 10/026; B60W 10/113;
(Continued)

(56) References Cited

U.S. PATENT DOCUMENTS 4,267,907 A * 5/1981 Hiraiwa ................. B60K 23/02
                                                            192/3.56
7,935,025 B1 * 5/2011 Lee ........................ B60W 10/06
                                                            477/115
(Continued)

FOREIGN PATENT DOCUMENTS

JP        2000-142162 A      5/2000
KR    10-2013-0047282 A      5/2013
(Continued)

*Primary Examiner* — Richard A Goldman
(74) *Attorney, Agent, or Firm* — Morgan, Lewis & Bockius LLP

(57) ABSTRACT

A method for stabilizing an engine clutch control includes transmitting an engine clutch operation start command from a controller to an engine clutch system, the engine clutch system including an engine clutch, detecting a hydraulic pressure generated during the operation of the engine clutch system, carrying out an oil leakage judgment mode using the controller to determine whether the hydraulic pressure is a normal hydraulic pressure where the operation of the engine clutch is available or if the hydraulic pressure an abnormal hydraulic pressure where the operation of the engine clutch is unavailable, and changing an operation mode to an emergency operation mode wherein the operation of the engine clutch is stopped in case of abnormal hydraulic pressure, and carrying out an operation mode change by operating the engine clutch in a case of normal hydraulic pressure, based on a control by the controller.

11 Claims, 8 Drawing Sheets

(51) Int. Cl.
*B60K 6/442* (2007.10)
*B60W 10/02* (2006.01)
*F16D 48/06* (2006.01)
*B60K 6/48* (2007.10)
*B60W 10/113* (2012.01)
*B60W 20/50* (2016.01)
*B60K 6/547* (2007.10)

(52) U.S. Cl.
CPC .......... *B60W 10/02* (2013.01); *B60W 10/113* (2013.01); *B60W 20/50* (2013.01); *F16D 48/066* (2013.01); *B60K 6/547* (2013.01); *B60K 2006/4825* (2013.01); *B60W 2510/02* (2013.01); *B60W 2510/0225* (2013.01); *B60W 2560/00* (2013.01); *B60Y 2200/92* (2013.01); *B60Y 2300/42* (2013.01); *B60Y 2400/406* (2013.01); *B60Y 2400/412* (2013.01); *F16D 2500/1026* (2013.01); *F16D 2500/10412* (2013.01); *F16D 2500/3024* (2013.01); *F16D 2500/501* (2013.01); *Y02T 10/6221* (2013.01); *Y02T 10/6252* (2013.01); *Y10S 903/914* (2013.01)

(58) Field of Classification Search
CPC .. B60W 20/00; B60W 20/50; B60W 2510/02; B60W 2510/0208; B60W 2510/0225; B60W 2560/00; B60K 6/387; B60K 6/442; B60K 6/48; B60K 6/547; B60K 2006/4825; B60Y 2200/92; B60Y 2300/42; B60Y 2400/406; B60Y 2400/412; F16D 48/06; F16D 48/066; F16D 2500/1026; F16D 2500/10412; F16D 2500/3024; F16D 2500/501; F16D 2500/70217; Y02T 10/6221; Y02T 10/6252; Y10S 903/914

USPC ....... 701/69; 477/5, 115, 83; 192/3.57, 3.58; 903/946

See application file for complete search history.

(56) References Cited

U.S. PATENT DOCUMENTS

| | | | | |
|---|---|---|---|---|
| 8,360,930 | B2* | 1/2013 | Kobayashi | F16D 25/086 477/83 |
| 9,126,590 | B2* | 9/2015 | Oel | B60W 20/40 |
| 2012/0136554 | A1* | 5/2012 | Yu | F02D 41/0002 701/104 |
| 2012/0312080 | A1* | 12/2012 | Klymenko | F16D 48/066 73/49.1 |
| 2013/0317716 | A1* | 11/2013 | Stoner | F02D 41/22 701/67 |
| 2014/0148306 | A1* | 5/2014 | Kim | B60W 10/02 477/5 |
| 2015/0006050 | A1* | 1/2015 | Egashira | F16H 61/143 701/68 |
| 2015/0130266 | A1* | 5/2015 | Kim | B60T 13/662 303/10 |
| 2015/0360673 | A1* | 12/2015 | Yoshida | B60W 10/06 477/5 |
| 2017/0166199 | A1* | 6/2017 | Kim | B60K 6/387 |
| 2017/0321765 | A1* | 11/2017 | Ruiters | F16D 48/066 |
| 2018/0050680 | A1* | 2/2018 | Kim | B60K 6/387 |
| 2018/0099659 | A1* | 4/2018 | Jeong | B60W 10/02 |
| 2018/0165896 | A1* | 6/2018 | Soh | G07C 5/0808 |

FOREIGN PATENT DOCUMENTS

| | | |
|---|---|---|
| KR | 10-1509943 B1 | 4/2015 |
| KR | 10-2015-0055791 A | 5/2015 |
| KR | 10-2015-0078365 A | 7/2015 |
| KR | 20150107307 A | 9/2015 |

* cited by examiner

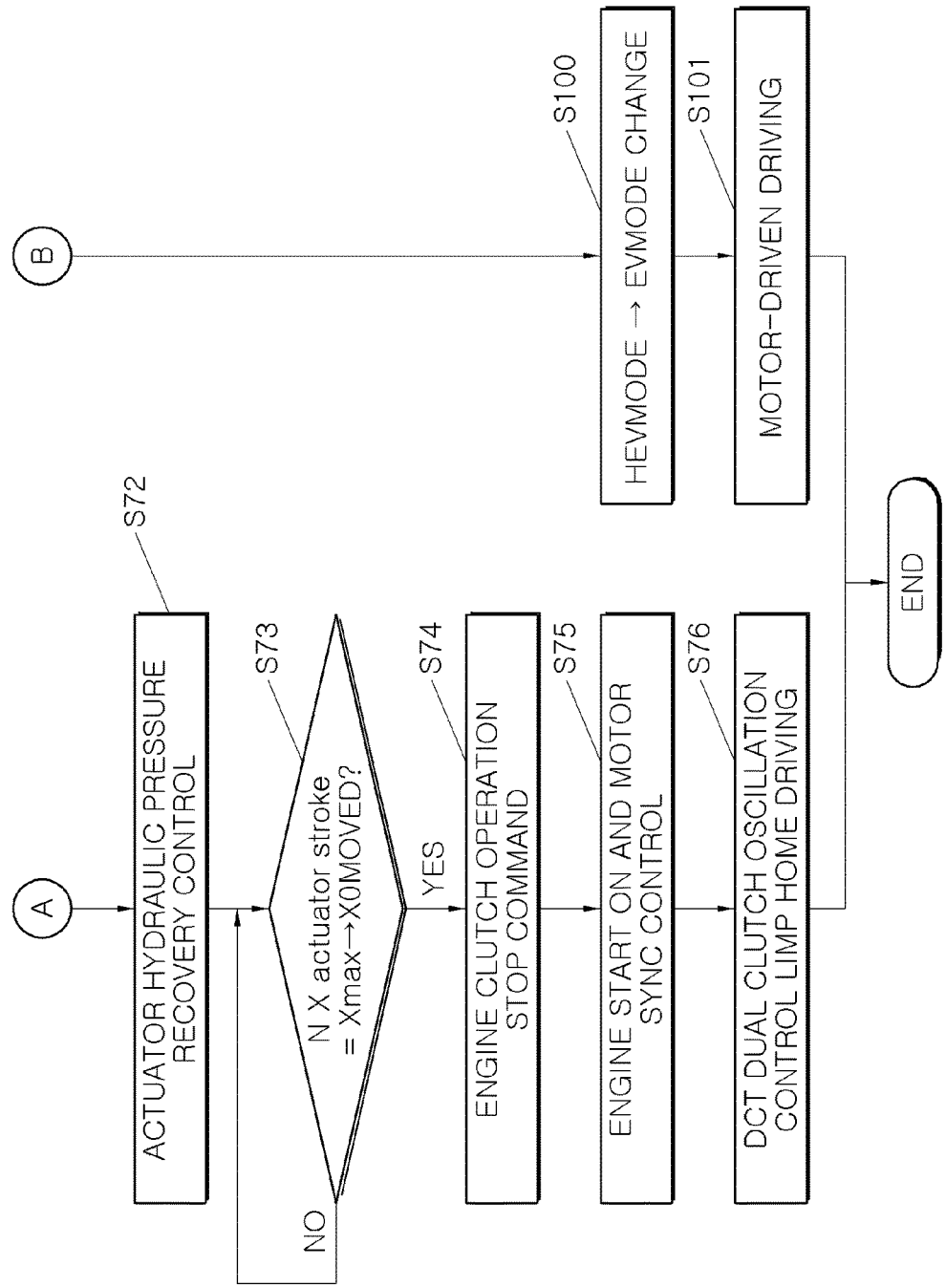

METHOD AND ENGINE CLUTCH SYSTEM FOR STABILIZING ENGINE CLUTCH CONTROL, AND VEHICLE EMPLOYING THE METHOD AND ENGINE CLUTCH SYSTEM FOR STABILIZING ENGINE CLUTCH CONTROL

CROSS-REFERENCE TO RELATED APPLICATIONS

This application claims the benefit of priority to Korean Patent Application No. 10-2015-0175688, filed on Dec. 10, 2015 with the Korean Intellectual Property Office, the disclosure of which is incorporated herein by reference in its entirety.

TECHNICAL FIELD

Exemplary embodiments of the present disclosure relate to an engine clutch control and, particularly to a method and engine clutch system for stabilizing a Dual Clutch Transmission (DCT)-based dry type engine clutch control, and an engine employing the same.

BACKGROUND

In general, a hybrid electronic vehicle (hereinafter referred to "HEV") is configured to use, as a power source, an internal combustion engine and an electric motor. HEVs can be categorized into parallel, serial and mild types in terms of power transfer structure. The HEV uses, as a transmission system, a Dual Clutch Transmission (DCT), wherein an even number gear input shaft and an odd number gear input shaft are used in conjunction with two clutches.

In particular, the HEV in general is operated in either the EV mode (Electric Vehicle Mode) wherein only the motor is used as a power source, and the HEV mode (Hybrid electric Vehicle Mode) wherein the engine and the motor are used together as a power source. An engine clutch system is employed to connect or disconnect the engine and the motor when changing the operation mode between the EV mode and the HEV mode.

For example, the engine clutch system may be formed of a NC (Normally Close) type engine clutch and a motored hydraulic actuator. If the motored hydraulic actuator does not operate, the engine clutch will maintain a connection between the engine and the motor, whereby the power connection between the engine and the motor can be maintained. If the motored hydraulic actuator operates, the engine clutch will disconnect the connection between the engine and the motor, thus disconnecting the power connection between the engine and the motor.

In this way, the HEV can be selectively operated in the EV mode or the HEV mode depending on the operation state of the engine clutch system.

The engine clutch system, however, may be configured to form a flow passage by connecting the motored hydraulic actuator and the engine clutch via a hydraulic line, whereby it may be impossible to control the engine clutch based on the motored hydraulic actuator if oil leaks. Repeated oil leakage may result in a failure in the normal operation of the engine clutch based on the motored hydraulic actuator.

SUMMARY

An embodiment of the present disclosure is directed to a method and engine clutch system for stabilizing an engine clutch control and an engine employing the same, wherein any oil leakage can be quickly detected in such a way to change an abnormal change in the hydraulic pressure of a motored hydraulic actuator due to an actuator stroke into an oil leakage data, and in particular, any clutch slip and clutch burning in an engine clutch control section due to an abnormal actuator stroke can be prevented by recovering the motored hydraulic actuator to a non-operation state in case of an oil leakage.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

According to one embodiment of the present disclosure, a method for stabilizing an engine clutch control, includes transmitting an engine clutch operation start command from a controller to an engine clutch system, the engine clutch system including an engine clutch provided to connect and disconnect an engine and a motor; detecting a hydraulic pressure generated during the operation of the engine clutch system; carrying out an oil leakage judgment mode using the controller so as to judge whether the hydraulic pressure is a normal hydraulic pressure where the operation of the engine clutch is available or if the hydraulic pressure an abnormal hydraulic pressure where the operation of the engine clutch is unavailable; and changing an operation mode to an emergency operation mode wherein the operation of the engine clutch is stopped in case of abnormal hydraulic pressure, and carrying out an operation mode change by operating the engine clutch in a case of normal hydraulic pressure, based on a control by the controller.

The hydraulic pressure may be generated by the actuator stroke of the motored hydraulic actuator of the engine clutch system.

The oil leakage judgment mode may be carried out in such a way that the motored hydraulic actuator of the engine clutch system is operated by the controller, the hydraulic pressure is detected as the current hydraulic pressure $P_{current}$ due to the increase in the actuator stroke, and the current hydraulic pressure $P_{current}$ is compared to the set limit hydraulic pressure $P_{limit}$, thus judging the normal hydraulic pressure and the abnormal hydraulic pressure.

The increase of the actuator stroke may be carried out from the initial stroke $X_0$ to the maximum stroke $X_{max}$, and the current hydraulic pressure $P_{current}$ is detected at the position of the maximum stroke $X_{max}$.

The limit hydraulic pressure $P_{limit}$ may be defined as a minimum hydraulic pressure among the hydraulic pressures which are generated when the motored hydraulic actuator normally operates without any oil leakage.

The normal hydraulic pressure may be a pressure in a case where the current hydraulic pressure $P_{current}$ is a pressure which is over the limit hydraulic pressure $P_{limit}$, and the abnormal hydraulic pressure may be a pressure in a case where the current hydraulic pressure $P_{current}$ is smaller than the limit hydraulic pressure $P_{limit}$ or is equal thereto.

The emergency operation mode may be carried out in such a way that the abnormal hydraulic pressure is created as an engine clutch system oil leakage code, the motored hydraulic actuator reversely operates in accordance with a control of the controller for the actuator stroke to be recovered to the initial state, the operation of the engine clutch is stopped after the actuator stroke is recovered to the initial state, and the control is changed to the limp home control after the operation of the engine clutch is stopped.

The initial state recovery of the actuator stroke may mean the position of the initial stroke $X_0$.

The limp home control may be carried out in such a way that the engine is driven by the controller, the motor is controlled in sync with the engine by the controller, and the DCT carries out an oscillation control by means of the controller.

The operation mode change may be carried out between a Hybrid Electric Vehicle (HEV) mode and an Electric Vehicle (EV) mode.

The engine clutch may be a dry type engine clutch which operates based on the Normally Close (NC) type engine clutch.

According to another embodiment of the present disclosure, an engine clutch system, includes a controller including an oil leakage detection map wherein the data to judge a system hydraulic pressure as a normal hydraulic pressure in the absence of an oil leakage and as an abnormal hydraulic pressure in the presence of an oil leakage is formed in the form of a map; a motored hydraulic actuator which includes an actuator motor controlled by a Local Control Unit (LCU) connected via a high speed Controller Area Network (CAN) communication line to the controller, a lead screw provided to change the rotation of the actuator motor into a straight line motion, a piston rod provided for generating an actuator stroke in cooperation with the lead screw, and a master cylinder which forms or removes a hydraulic pressure based on an oil supply or recovery of the oil reservoir in response to a motion of the piston rod; a pressure sensor for detecting the hydraulic pressure of the master cylinder and supplying the detection to the controller; a Concentric Slave Cylinder (SCS) which is connected to the master cylinder via a hydraulic line and generates a hydraulic pressure stroke based on the supplied hydraulic pressure; and an engine clutch connected to the CSC and a spring and configured to receive the hydraulic pressure stroke.

According to another embodiment of the present disclosure, a vehicle includes an engine clutch system including a controller having an oil leakage detection map wherein the data to judge a system hydraulic pressure as a normal hydraulic pressure in the absence of an oil leakage and an abnormal hydraulic pressure in the presence of an oil leakage is formed in the form of a map, a motored hydraulic actuator controlled by the controller and generating a hydraulic pressure based on the actuator stroke, a pressure sensor for detecting a hydraulic pressure and supplying the detection to the controller, a Concentric Slave Cylinder (CSC) for receiving the hydraulic pressure and generating a hydraulic pressure stroke, and an engine clutch connected to the CSC and a spring and receiving the hydraulic pressure stroke; an engine connected to a Hybrid Starter & Generator (HSG); a motor which employs a Hybrid Electric Vehicle (HEV) mode when is connected to the engine by the engine clutch system and employs an Electric Vehicle (EV) mode when disconnected from the engine; and a Dual Clutch Transmission (DCT) connected to the motor.

According to the present disclosure, the following advantages and effects can be obtained in such a way that an engine clutch system which is able to normally control an engine clutch in case of an oil leakage is provided at a vehicle. First, a control structure of an engine clutch system can be provided, which is able to control a DCT-based engine clutch using a motored hydraulic. Second, a HEV mode control logic can be provided, which is able to detect any oil leakage at the engine clutch system. Third, any clutch burning which may cause a clutch slip due to an abnormal actuator stroke in an engine clutch control section can be prevented. Fourth, the engine clutch system may be developed into a DCT-based dry type engine clutch system. Fifth, an oil leakage detection limp home control technology in a future DCT-based dry engine clutch system-employed hybrid vehicle can be preoccupied.

BRIEF DESCRIPTION OF THE DRAWINGS

FIGS. 1A and 1B are flowcharts for describing a method for stabilizing an engine clutch control according to embodiments of the present disclosure.

DETAILED DESCRIPTION

Figure 1A:
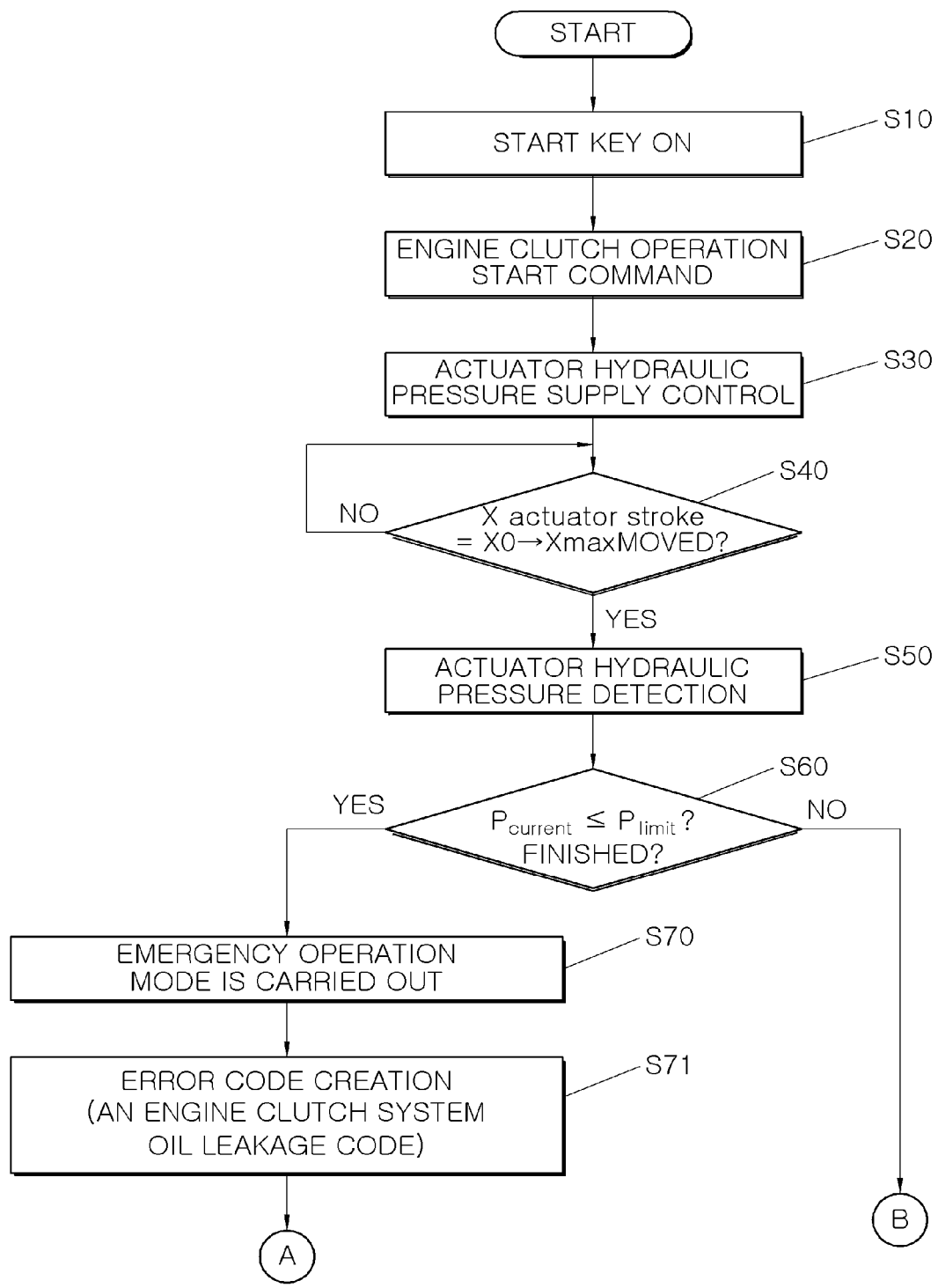

The terms and words used in the specification and claims should not be construed as their ordinary or dictionary meanings. On the basis of the principle that the inventor can define the appropriate concept of a term in order to describe his/her own disclosure in the best way, meanings should be construed as meaning and concepts for complying with the technical idea of the present disclosure. Accordingly, the embodiments described in the present specification and the construction shown in the drawings are merely one preferred embodiment of the present disclosure, and the detailed description section does not cover all the technical ideas of the disclosure. Thus, it should be understood that various changes and modifications may be made at the time of filing the present application. In addition, detailed descriptions of functions and constructions well known in the art may be omitted to avoid unnecessarily obscuring the concepts of the present disclosure. Exemplary embodiments of the present disclosure will be described below in more detail with reference to the accompanying drawings.

FIGS. 1A and 1B are flowcharts for describing a method for stabilizing an engine clutch control according to embodiments of the present disclosure. As illustrated therein, a method for stabilizing an engine clutch control according to the present disclosure is provided, wherein any oil leakage at a hydraulic line can be detected based on a limit pressure value with respect to a hydraulic pressure area of an actuator stroke in such a way to recognize an occasion wherein the hydraulic pressure is abnormally generated due to the actuator stroke at an engine clutch system in a case of an oil leakage at the hydraulic line. Accordingly, the vehicle can then be changed to a limp home (a minimum driving state of the vehicle due to a hardware error) as an emergency operation mode in case of an oil leakage. As a result, the vehicle is able to obtain a HEV mode control logic without any clutch slip and burning due to an abnormal actuator stroke in the clutch control section.

Figure 2:
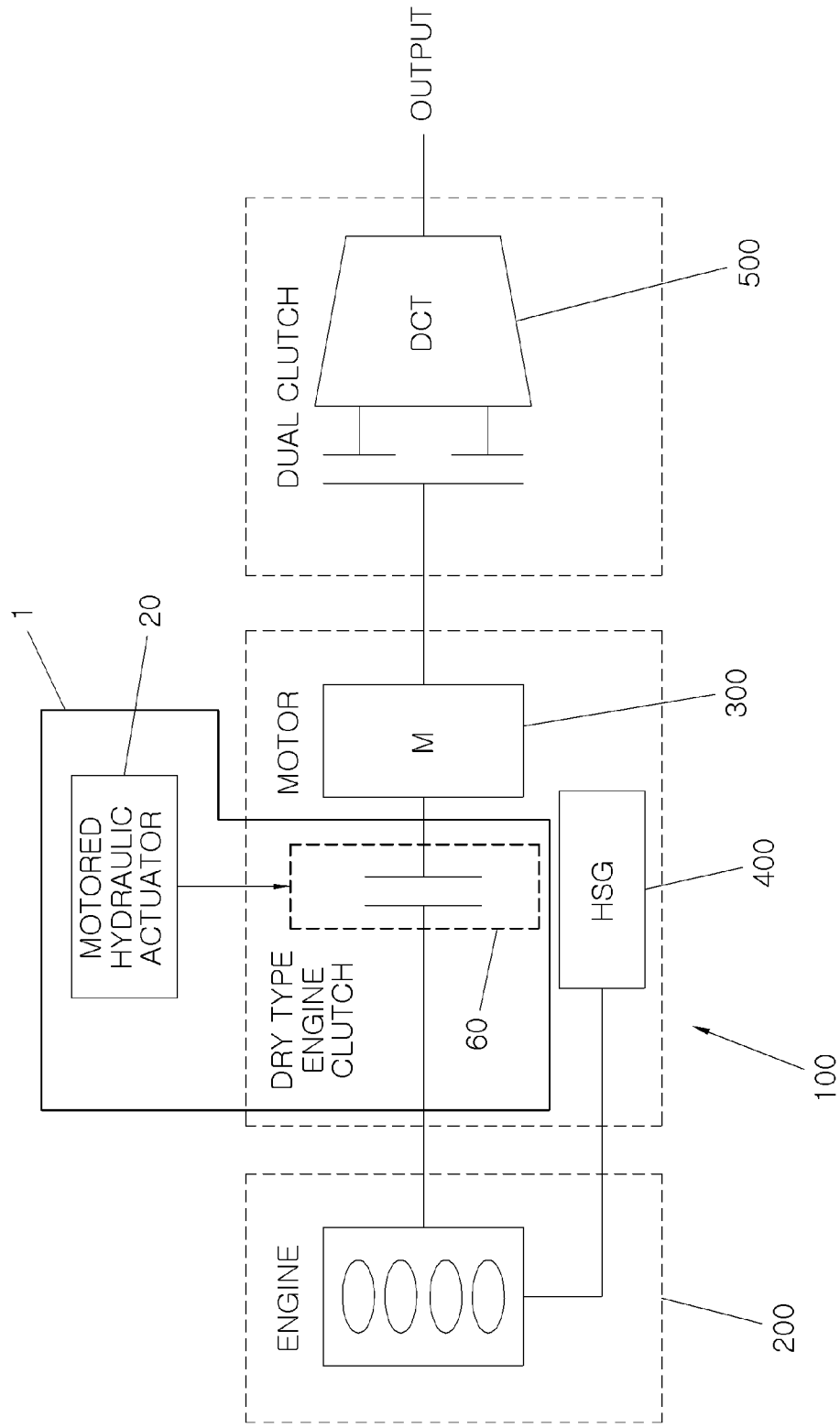
FIG. 2 is a view illustrating an example of a vehicle which is employing a method for stabilizing an engine clutch control according to embodiments of the present disclosure.
Figure 3:
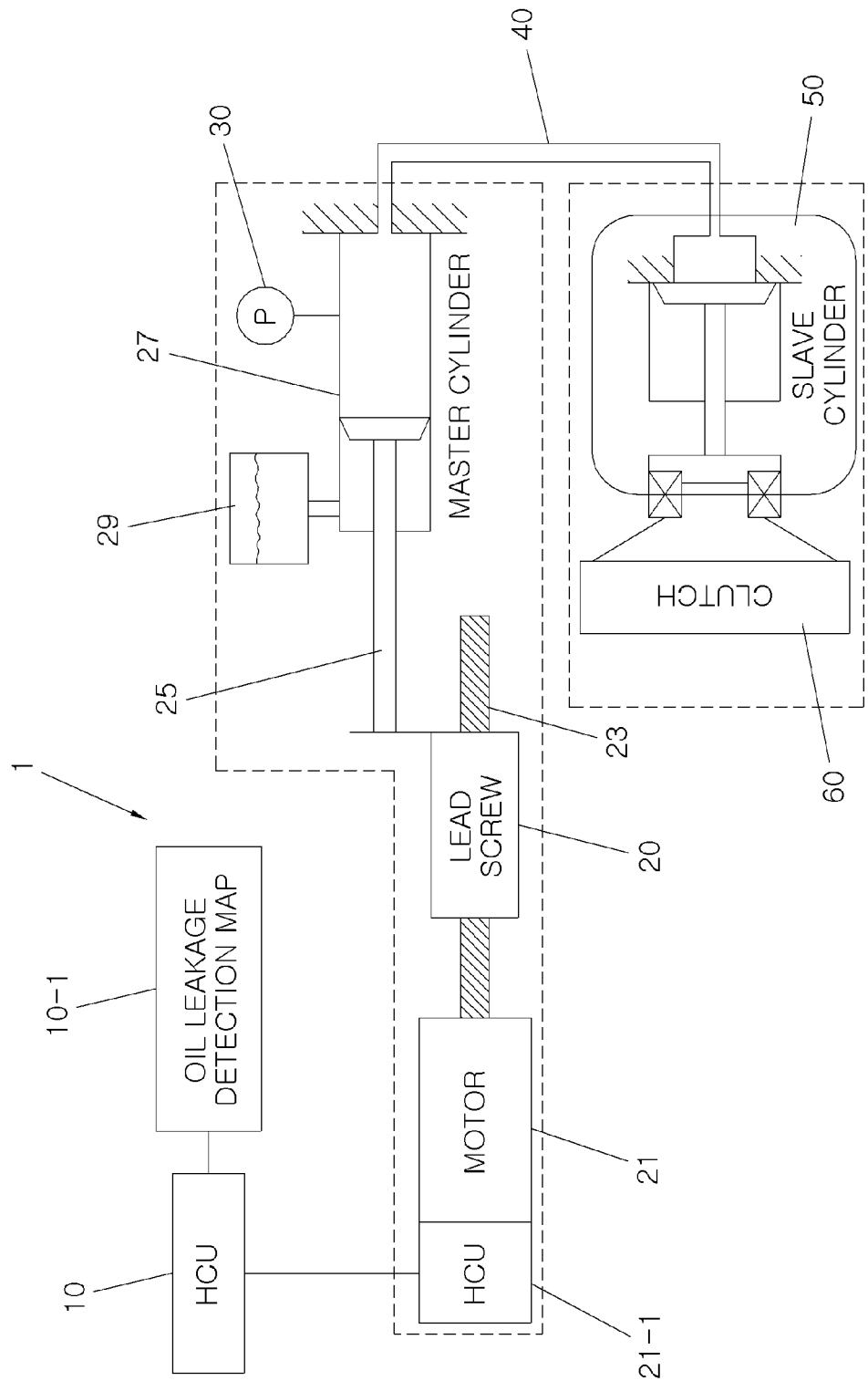
FIG. 3 is a view illustrating a detailed configuration of an engine clutch system according to embodiments of the present disclosure.

FIG. 2 and FIG. 3 are views illustrating a vehicle and an engine clutch to which the method for stabilizing an engine clutch control is employed according to embodiments of the present disclosure.

Referring to FIG. 2, the vehicle 100 may include, but is not limited to, an internal combustion type engine 200, an electric motor type motor 300, a HSG (Hybrid Starter & Generator) 400 which is connected to a crank shaft of the engine 200 and is provided to drive the engine 200 when the engine is started, a DCT (Dual Clutch Transmission) 500 which is connected to the motor 300 and is configured to operate as a transmission system, and an engine clutch system 1 which is able to change the driving mode between the HEV mode and the EV mode in response to a connection and disconnection control of the engine 200 and the motor 300.

Referring to FIG. 3, the engine clutch system 1 may include, but is not limited to, a controller 10, an oil leakage detection map 10-1, a motored hydraulic actuator 20, a pressure sensor 30, a hydraulic line 40, a CSC (Concentric Slave Cylinder) 50 and an engine clutch 60.

More specifically, the controller 10 may be configured to operate as an upper level controller which is connected, via a high speed CAN (Controller Area Network) communication line, to each lower level controller of the vehicle 100 which may include a LCU (Local Control Unit) 21-1 of the motored hydraulic actuator 20. The controller 10, therefore, may be the same as an HCU (Hybrid Control Unit) which is provided to control the HEV/EV modes and the limp home. In particular, the controller 10 may be connected to, or may include, an oil leakage detection map 10-1 so as to read the data of the oil leakage detection map 10-1. The oil leakage detection map 10-1 may be formed into a map which may include a limit hydraulic pressure to judge a normal hydraulic pressure and an oil leakage due to the actuator stroke of the motored hydraulic actuator 20, and an engine clutch system oil leakage code, etc. related with the oil leakage. Moreover, the controller 10 may be configured to supply any instruction or command to the PWM (Pulse Width Modulation) DUTY.

More specifically, the motored hydraulic actuator 20 may include, but is not limited to, an actuator motor 21 which is controlled by an LCU (Local Control Unit) 21-1 connected to the controller 10 via a high speed CAN communication line, a lead screw 23 which converts the rotation of the actuator motor 21 into a straight movement, a piston rod 25 which generates an actuator stroke in sync with the lead screw 23, and a master cylinder 27 which is able to form a hydraulic pressure or remove the hydraulic pressure in accordance with an oil supply or recovery of an oil reservoir based on the motion of the piston rod 25.

More specifically, the pressure sensor 30 detects the hydraulic pressure which is generate at the master cylinder 27 and transmits the detection to the oil leakage detection map 10-1 (or the controller connected via a high speed CAN communication line).

More specifically, the hydraulic line 40 connects the master cylinder 27 and the CSC 50, thus supplying the hydraulic pressure which has generated at the master cylinder 27 to the CSC 50. In particular, the hydraulic line 40 may be formed of a hose or a pipe.

More specifically, the CSC 50 is connected to the spring of the engine clutch 60 and is provided to supply, to the engine clutch 60, the stroke generated by the hydraulic pressure from the hydraulic line 40. In particular, the CSC 50 may be formed of the type of a module which is equipped with the functions of a clutch release cylinder, a release lever, a release fork, a release bearing, a pivot and an input shaft sleeve.

More specifically, the engine clutch 60 may be formed of a dry type engine clutch which can operate by way of the NC (Normally Close) and is provided to disconnect the engine 200 and the motor 300 which have been connected by the operation of the CSC 50. The engine clutch 60, therefore, will change the operation mode of the vehicle 100 from the HEV mode to the EV mode in such a way to disconnect the engine 200 and the motor 300.

The embodiment of the method for stabilizing an engine clutch control of the present disclosure will be described with reference to FIG. 4 to FIG. 7. In this case, the main control component may be a controller 10, and the controller 10 may employ the HCU.

The step S10 is a step wherein the start key on of the vehicle is recognized by the controller 10. In this case, the start key on of the vehicle means a state before the engine 200 is started.

Figure 4:
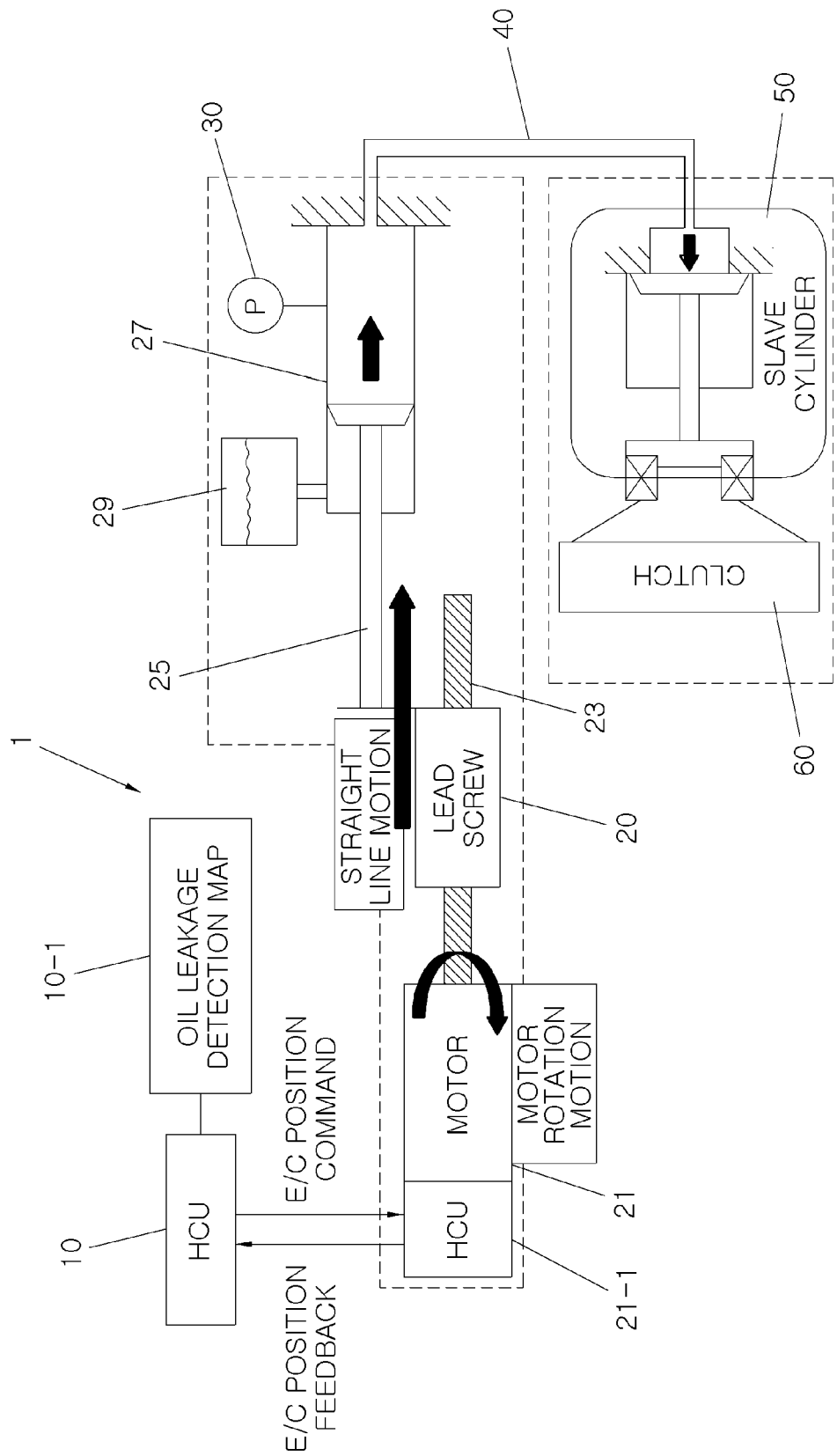
FIG. 4 is a view illustrating an operation state of an engine clutch system according to embodiments of the present disclosure.

The step S20 is a step wherein an engine clutch operation start command is transmitted from the controller 10. Referring to FIG. 4, the controller 10 will transmit a motor rotation command to the LCU 21-1, and the LCU 21-1 will allow rotation of the actuator motor 21 in response to a motor rotation command. It will be, hereinafter, assumed that the rotation direction of the actuator motor is a direction wherein the actuator stroke can be increased.

The step S30 is a step wherein the actuator hydraulic pressure supply control is carried out by the controller 10. Referring to FIG. 4, the controller 10 may keep transmitting a command to the LCU 21-1 for the actuator motor 21 to continuously rotate. As a result, the rotation of the actuator motor 21 is converted into a forward straight movement of the lead screw 23, thus allowing the piston rod 25 to forwardly move toward the master cylinder 27, and the forward movement of the piston rod 25 may result in the increase in the actuator stroke. Thereafter, the oil in the chamber of the master cylinder 27 is pressurized by the piston rod 25. For this reason, a hydraulic pressure can be formed at the master cylinder 27 thanks to the increase in the actuator stroke.

The step S40 is a step wherein the actuator hydraulic pressure supply control is finished with an actuator stroke increase control of the controller 10. Referring to FIG. 4, the controller 10 will stop the actuator hydraulic pressure supply control when the actuator stroke ($X_{actuator\ stroke}$) is changed into a maximum actuator stroke ($X_{max}$) (namely, the disconnection of the engine clutch) at the initial actuator stroke ($X_0$) (namely, the connection of the engine clutch). For this, the controller 10 may use the sensor installed at the master cylinder 27 to detect $X_{actuator\ stroke}$ or may use the oil leakage detection map 10-1, wherein $X_0$ and $X_{max}$ of the motored hydraulic actuator 20 are stored in the form of a data.

The step S50 is a step wherein the hydraulic pressure generated at the motored hydraulic actuator 20 is recognized by the controller 10. In this case, the controller 10 receives the hydraulic pressure detected by the pressure sensor 30 and recognizes the received hydraulic pressure as the current hydraulic pressure of the motored hydraulic actuator 20, and defines it as $P_{current}$. Here, $P_{current}$ means a hydraulic pressure that the pressure sensor 30 generates at the master cylinder 27 at the maximum forward position (namely, $X_{max}$) of the piston rod 25.

Figure 5:
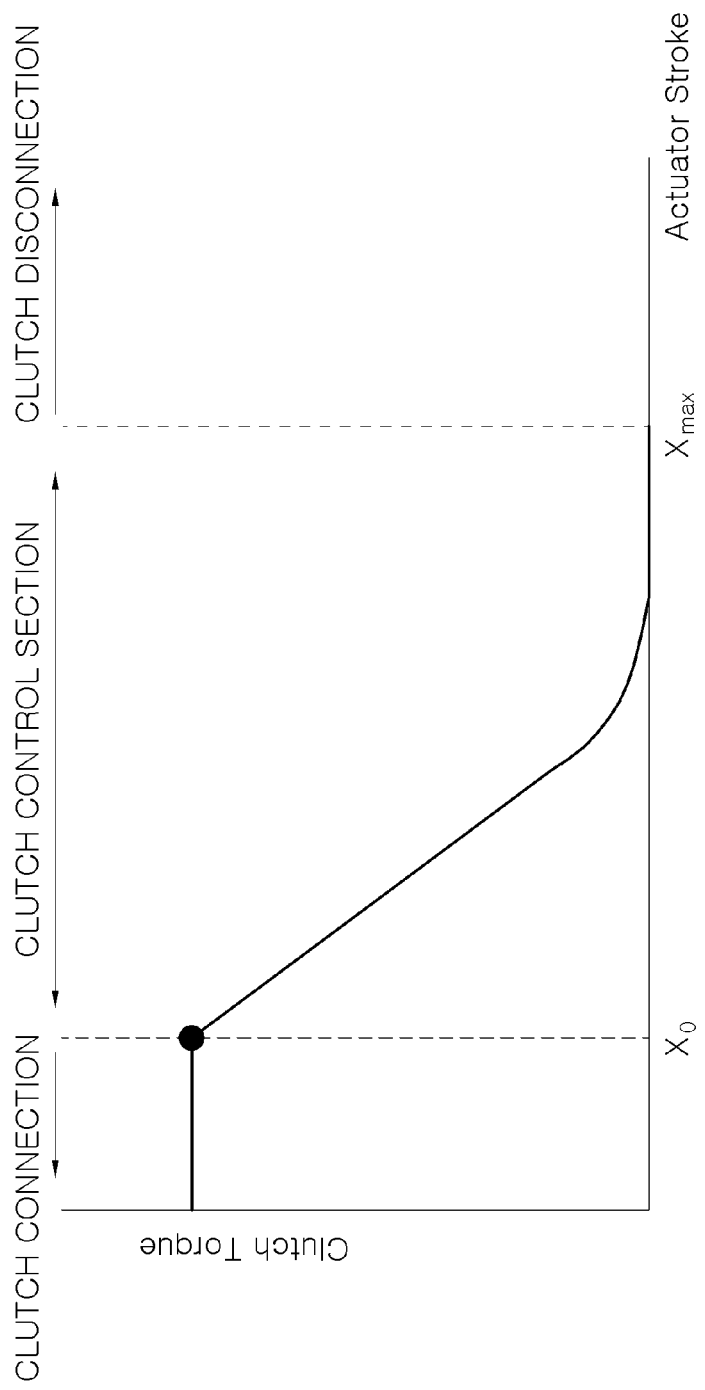
FIG. 5 is a graph illustrating an example of a hydraulic pressure curve of a motored hydraulic actuator according to embodiments of the present disclosure.

The step S60 is a step wherein the oil leakage at the motored hydraulic actuator 20 is judged by the controller 10. In this case, the controller 10 will employ $P_{limit}$ which is in contrast with $P_{current}$. $P_{limit}$ means the minimum normal hydraulic pressure in the normal hydraulic pressure area which is detected as the position of $X_{max}$ wherein the motored hydraulic actuator 20 is in the normal operation state where there is not any oil leakage, and $P_{limit}$ may be defined as a limit hydraulic pressure. $P_{limit}$ will be stored in the oil leakage detection map 10-1 in the form of a data. The controller 10, therefore, is able to judge the oil leakage state of the motored hydraulic actuator 20 in such a way as to use $P_{current}$ detected by the pressure sensor 30 and $P_{limit}$ stored at the oil leakage detection map 10-1. For this, the controller 10 may employ a relational formula of $P_{current} \leq P_{limit}$, wherein "≤" means a sign of inequality which shows a size relationship between two values and means that $P_{limit}$ is larger than or equal to $P_{current}$. Referring to FIG. 5, there is shown a pressure characteristic with respect to the actuator stroke of the motored hydraulic actuator 20. Since the abnormal hydraulic pressure judgment range is formed below the normal hydraulic pressure curve, it is possible to judge any oil leakage by using $P_{limit}$.

Figure 6:
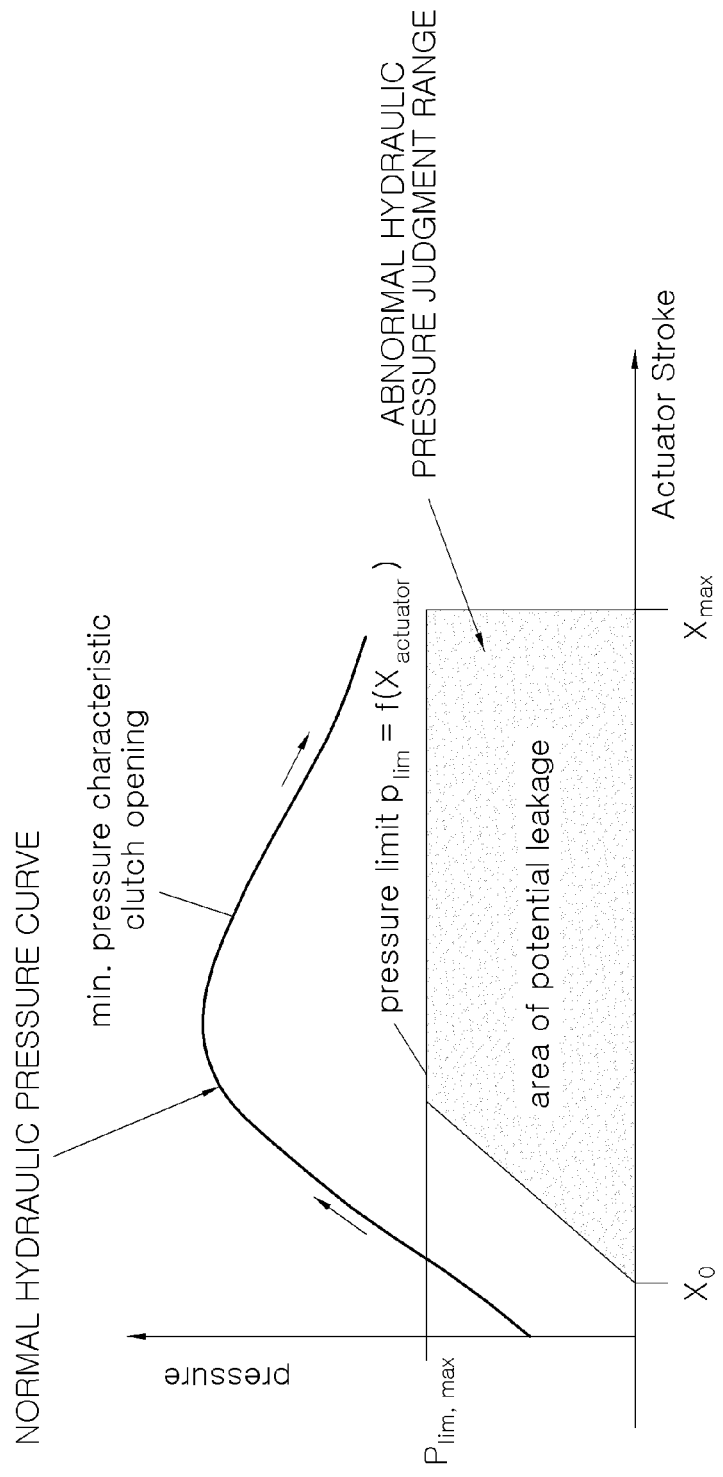
FIG. 6 is a clutch control curve of an engine clutch which is associated with a motored hydraulic actuator according to embodiments of the present disclosure.

As a result of the check in the step S60, if the controller 10 goes to the emergency operation mode of a step S70 if the current hydraulic pressure $P_{current}$ is smaller than the limit hydraulic pressure $P_{limit}$, and if the current hydraulic pressure $P_{current}$ is larger than or equal to the limit hydraulic pressure $P_{limit}$, the controller 10 will go to the mode change (HEV->EV) in a step S100. Referring to FIG. 6, shown is an operation relationship between the motored hydraulic actuator 20 and the engine clutch 60. As illustrated therein, the controller 10 will judge the normal state of the hydraulic pressure with respect to the actuator stroke section ($X_0$<->$X_{max}$), by means of which the engine clutch 60 cannot be operated with the abnormal hydraulic pressure in the clutch control section which matches with the actuator stroke section ($X_0$<->$X_{max}$). As a result, the engine clutch 60 will prevent any clutch burning which may occur due to clutch slip in the clutch control section.

The emergency operation mode in the step S70 may be classified into an initial state recovery control of the engine clutch system in the steps S71 to S74, and a limp home control of the steps S75 and S76. Therefore, if the actuator stroke does not automatically recover the close state of the engine clutch 60 to the initial state when the oil is leaking, the vehicle 100 will be driven only in the EV mode, thus preventing a SOC (State Of Charge) depletion of the high voltage battery which might occur if the vehicle 100 is driven only in the EV mode.

The step S71 is a step wherein an error code is generated by the controller 10. Referring to FIG. 4, the controller 10 will read the oil leakage code of the engine clutch system stored in the oil leakage detection map 10-1 and store a corresponding oil leakage code or display the oil leakage code on a screen or use it as an alarm lamp turning-on signal.

The step S72 is a step wherein the actuator hydraulic pressure recovery control is carried out by the controller 10. Referring to FIG. 4, the controller 10 will transmit a motor reverse rotation command to the LCU 21-1, and the LCU 21-1 will reversely rotate the actuator motor 21 in response to a motor reverse rotation command. The reverse rotation of the actuator motor 21 will be converted into a backward straight line movement of the lead screw 23, thus moving backward the piston rod 25 so that it can separate from the master cylinder 27, and the movement of the piston rod will cause a decrease in the actuator stroke. Since the piston rod 25 separates from the master cylinder 27, a hydraulic pressure may decrease at the master cylinder 27 due to the decrease in the actuator stroke.

The step S73 is a step where the actuator hydraulic pressure recovery control is finished with the aid of the actuator stroke recovery control of the controller 10. Referring to FIG. 4, the controller 10 will stop the actuator hydraulic recovery control when $X_{actuator\ stroke}$ has changed from $X_{max}$ to $X_0$.

The step S74 is a step wherein the engine clutch operation stop command is transmitted from the controller 10. Referring to FIG. 4, the controller 10 transmits a motor control command to the LCU 21-1, and the LCU 21-1 stops the actuator motor 21 in response to a motor stop command. As a result, the initial state recovery control of the engine clutch system 1 due to the oil leakage is finished.

The step S75 is a step wherein the limp home control entry is carried out by the controller 10. Referring to FIG. 2, the controller 10 will transmit a control command to the HSG 400 based on an engine start on event, thus starting the engine 200 and controlling the motor in sync with the resolution per minute of the engine 200. As a result, the vehicle 100 will carry out a sync control of the engine 200 and the motor 300 in the HEV mode wherein the engine clutch 60 is in the close state.

The step S76 is a step wherein the limp home control is carried out by the controller 10. Referring to FIG. 2, the controller 10 will carry out an oscillation control using the slip-possible DCT clutch of the DCT 500, whereupon the vehicle 100 can be, or enter, a limp home driving state.

Figure 7:
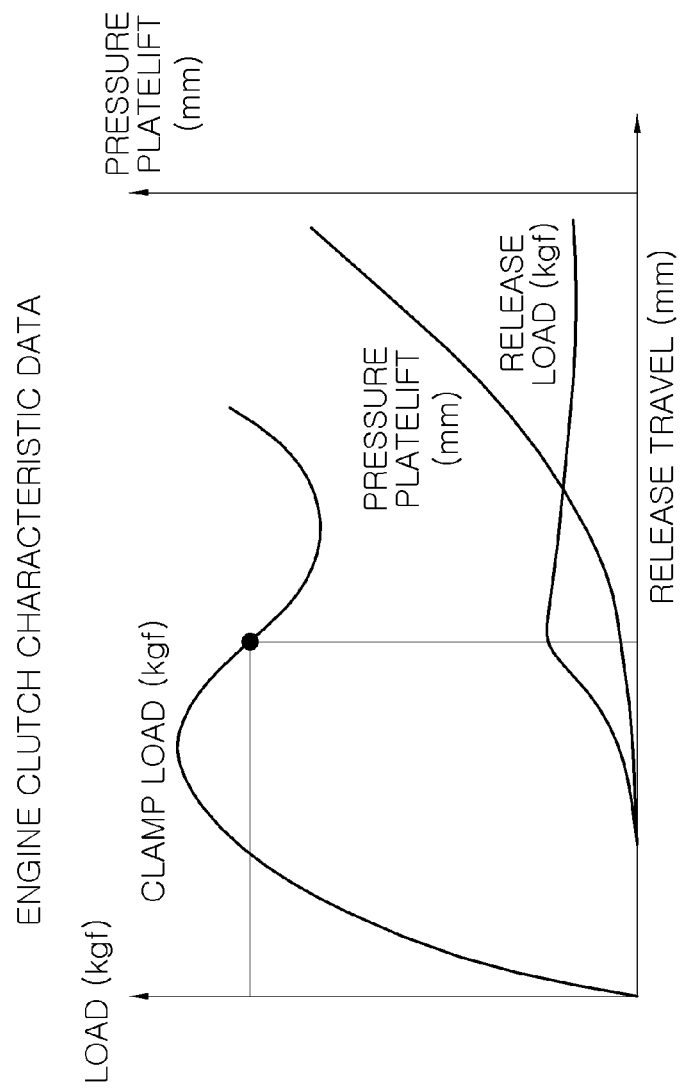
FIG. 7 is a graph illustrating an operation state of an engine clutch system in an EV mode of a vehicle according to the present disclosure.

Meanwhile, the step S100 is a step wherein the mode change will be carried out if the current hydraulic pressure $P_{current}$ is larger than or equal to the limit pressure $P_{limit}$, and the step S110 is a step wherein the vehicle will be driven with the motor after the operation move is changed from the HEV mode to the EV mode. Referring to FIG. 1 and FIG. 7, the CSC 50 may cause a CSC release travel with a motion which is in proportion to the actuator stroke of the motored hydraulic actuator 20 and may generate a hydraulic pressure which is in proportion to the release load based on a change in the actuator stroke and may transfer it to the engine clutch. Thereafter, the engine clutch 60 will be opened due to the increase in the actuator stroke in the close state which corresponds to the initial state, and the change from the close state to the opening state of the engine clutch may mean, or cause, a change from the HEV mode to the EV mode, so the vehicle can be driven in the EV mode.

The steps S100 and S110 are related to the normal driving state of the vehicle.

As described above, in the method for stabilizing the engine clutch control according to the embodiment of the present disclosure, the engine clutch system 1 having the engine clutch 60 which is able to connect and disconnect the engine 200 and the motor 300 receives an engine clutch operation start command by the controller 10, and the current hydraulic pressure $P_{current}$ detected based on the stroke of the motored hydraulic actuator of the engine clutch system 1 is compared to the limit hydraulic pressure $P_{limit}$, whereby the normal hydraulic pressure due to the absence of the oil leakage is judged, and the abnormal hydraulic pressure due to the presence of the oil leakage is judged. Since the dry type engine clutch 60 which operates in the NC (Normally Close) of the engine clutch system 1 can be operated only in case where the hydraulic oil is in the normal state in order to prevent any clutch slip and clutch burning in the engine clutch control section, stability of the HEV mode logic of the vehicle 100 can be obtained.

While the present disclosure has been described with respect to the specific embodiments, it will be apparent to those skilled in the art that various changes and modifications may be made without departing from the spirit and scope of the disclosure as defined in the following claims.

What is claimed is:

1. A method for stabilizing an engine clutch control, comprising:
   transmitting an engine clutch operation start command from a controller to a Local Control Unit (LCU) of an engine clutch system, the engine clutch system including an engine clutch provided to connect and disconnect an engine and a motor;
   detecting, by a pressure sensor, a hydraulic pressure generated at a master cylinder during an operation of a motored hydraulic actuator;
   carrying out an oil leakage judgment mode using the controller to determine whether the hydraulic pressure is a normal hydraulic pressure where the operation of the engine clutch is available or if the hydraulic pressure is an abnormal hydraulic pressure where the operation of the engine clutch is unavailable; and
   changing, by the controller, an operation mode of the motored hydraulic motor to an emergency operation mode in which the operation of the engine clutch is stopped when the hydraulic pressure is the abnormal hydraulic pressure, and carrying out the operation mode of the motored hydraulic actuator, in which the operation of the engine clutch is performed when the hydraulic pressure is the normal hydraulic pressure, by the LCU receiving the command of the controller.

2. The method of claim 1, wherein the hydraulic pressure is generated by an actuator stroke of the motored hydraulic actuator of the engine clutch system.

3. The method of claim 1, wherein the oil leakage judgment mode is carried out such that the motored hydraulic actuator of the engine clutch system is operated by the controller, the hydraulic pressure is detected as a current hydraulic pressure $P_{current}$ due to the increase in an actuator stroke, and the current hydraulic pressure $P_{current}$ is compared to a set limit hydraulic pressure $P_{limit}$ to determine the normal hydraulic pressure and the abnormal hydraulic pressure.

4. The method of claim 3, wherein the increase of the actuator stroke is carried out from an initial stroke $X_0$ to a maximum stroke $X_{max}$, and the current hydraulic pressure $P_{current}$ is detected at a position of the maximum stroke $X_{max}$.

5. The method of claim 3, wherein the set limit hydraulic pressure $P_{limit}$ as a minimum hydraulic pressure used in determining whether the hydraulic pressure is the hydraulic pressure between an initial stroke $X_0$ and a maximum stroke $X_{max}$ of the actuator stroke.

6. The method of claim 3, wherein the normal hydraulic pressure is verified when the current hydraulic pressure $P_{current}$ is greater than the limit hydraulic pressure $P_{limit}$, and the abnormal hydraulic pressure is verified when the current hydraulic pressure $P_{current}$ is equal to or smaller than the limit hydraulic pressure $P_{limit}$.

7. The method of claim 1, wherein the emergency operation mode is carried out when an engine clutch system oil leakage is determined in a case in which the hydraulic pressure is the abnormal pressure, such that the motored hydraulic actuator returns an actuator stroke to an initial state by a control of the controller the operation of the engine clutch is stopped after the actuator stroke is recovered to the initial state, and the control is changed to a limp home control after the operation of the engine clutch is stopped.

8. The method of claim 7, wherein the actuator stroke is in the initial state the initial stroke when the actuator stroke is at an initial stroke $X_0$.

9. The method of claim 7, wherein the limp home control is carried out such that the engine is driven by the controller, the motor is controlled in sync with the engine by the controller, and a Dual Clutch Transmission (DCT) carries out an oscillation control by means of the controller.

10. The method of claim 1, wherein the operation mode change is carried out between a Hybrid Electric Vehicle (HEV) mode and an Electric Vehicle (EV) mode.

11. The method of claim 1, wherein the engine clutch is a dry type engine clutch.

* * * * *